(No Model.)

J. BARBIERE.
VEHICLE WHEEL.

No. 311,280. Patented Jan. 27, 1885.

WITNESSES:
INVENTOR:
Jos. Barbiere
BY John A. Diedersheim
ATTORNEY.

UNITED STATES PATENT OFFICE.

JOSEPH BARBIERE, OF LANSDALE, PENNSYLVANIA.

VEHICLE-WHEEL.

SPECIFICATION forming part of Letters Patent No. 311,280, dated January 27, 1885.

Application filed September 18, 1884. (No model.)

*To all whom it may concern:*

Be it known that I, JOSEPH BARBIERE, a citizen of the United States, residing at Lansdale, in the county of Montgomery, State of Pennsylvania, have invented a new and useful Improvement in Vehicle-Wheels, which improvement is fully set forth in the following specification and accompanying drawings, in which—

Figure 1:
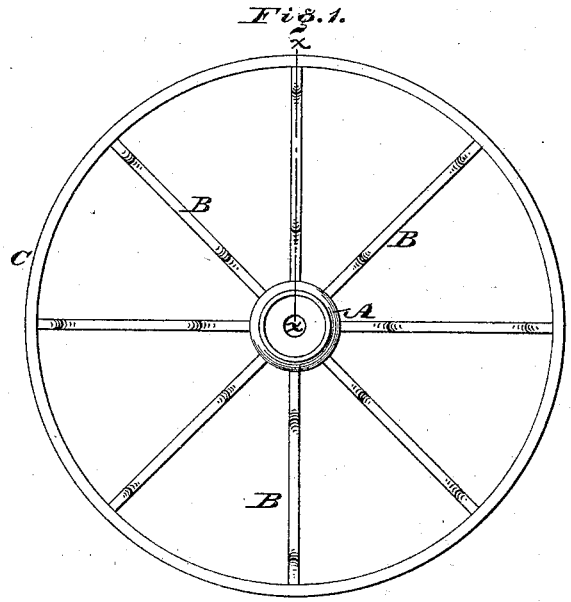
Figure 2:
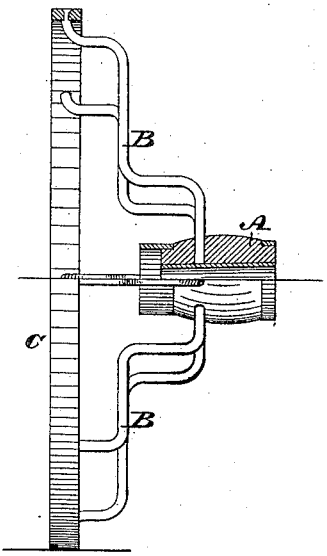

Figure 1 represents a side elevation of a vehicle-wheel embodying my invention. Fig. 2 represents a section thereof in line $xx$, Fig. 1.

Similar letters of reference indicate corresponding parts in the two figures.

My invention consists of a vehicle-wheel which is light, strong, and durable, rides easily, and clears itself of mud, as will be hereinafter fully set forth.

Referring to the drawings, A represents the hub of a vehicle-wheel, B the spokes, and C the tire or rim thereof. The spokes are made of metal—such as round iron or heavy wire—and of serpentine or double-arch form, the hub being on the inner side of the wheel instead of the outer side, as heretofore constructed. Furthermore, the spokes are set back from the tire in the direction of the axle, so that almost the entire portion of the tire is unoccupied by the spokes, the latter being, in the main, outside of said tire. It will be seen that the wheel is light, and the shape of the spokes renders the same strong and durable. Again, mud is prevented from clogging the wheel, as there is no place for lodgment of the same, excepting adjacent to the tire, where its hold is limited, and should it lodge on the spokes it readily drops therefrom, as it is not restrained by the tire. The location of the spoke is also a matter of importance, as it does not project to strike objects along the road, and the driver is permitted to steer the vehicle with greater facility, as his guide is the tire, which is the extreme outside portion of the wheel, and the same may be readily observed and watched, more so than can be said of hubs on the outside of the wheels.

Having thus described my invention, what I claim as new, and desire to secure by Letters Patent, is—

1. A vehicle-wheel having a hub composed of a separate piece from the spokes and out of the plane of the rim, and provided with spokes of a double-arch form in the direction of the axle, and a rim, said parts being arranged and combined substantially in the manner and for the purpose specified.

2. A vehicle-wheel having its hub out of the plane of the rim thereof, and provided with spokes of a double-arch form, the ends secured to the hub being straight and in the same plane, the outer surface of the rim being a plane curve, substantially as and for the purpose set forth.

JOSEPH BARBIERE.

Witnesses:
JOHN A. WIEDERSHEIM,
A. P. GRANT.